July 30, 1940.　　　　E. J. SIMANEK　　　　2,209,795
CLASP BRAKE ARRANGEMENT
Filed Aug. 25, 1938　　　2 Sheets-Sheet 1
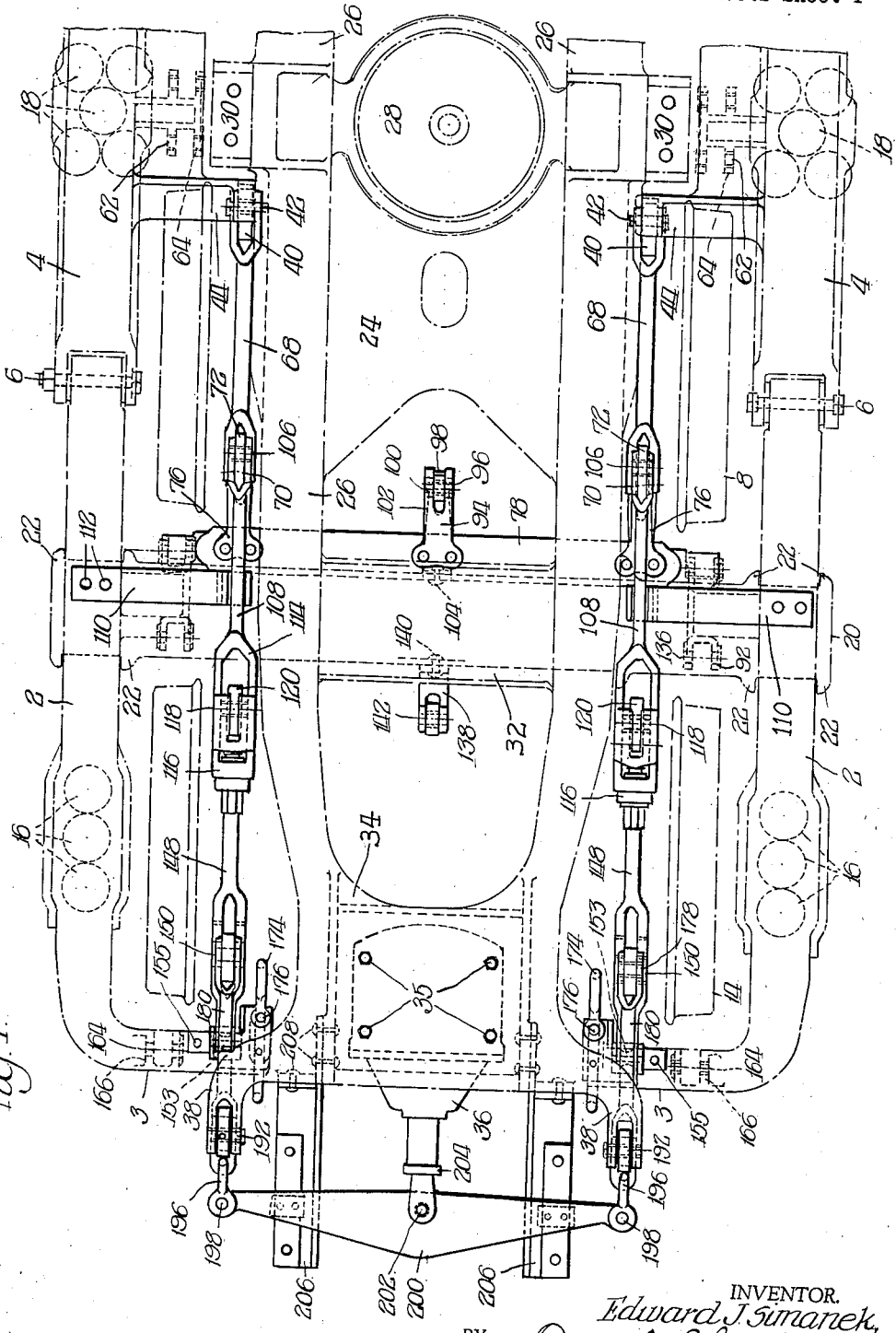
INVENTOR.
Edward J. Simanek,
BY
　　Carin O. B. Garner
　　　　　ATTORNEY.

July 30, 1940.  E. J. SIMANEK  2,209,795
CLASP BRAKE ARRANGEMENT
Filed Aug. 25, 1938  2 Sheets-Sheet 2
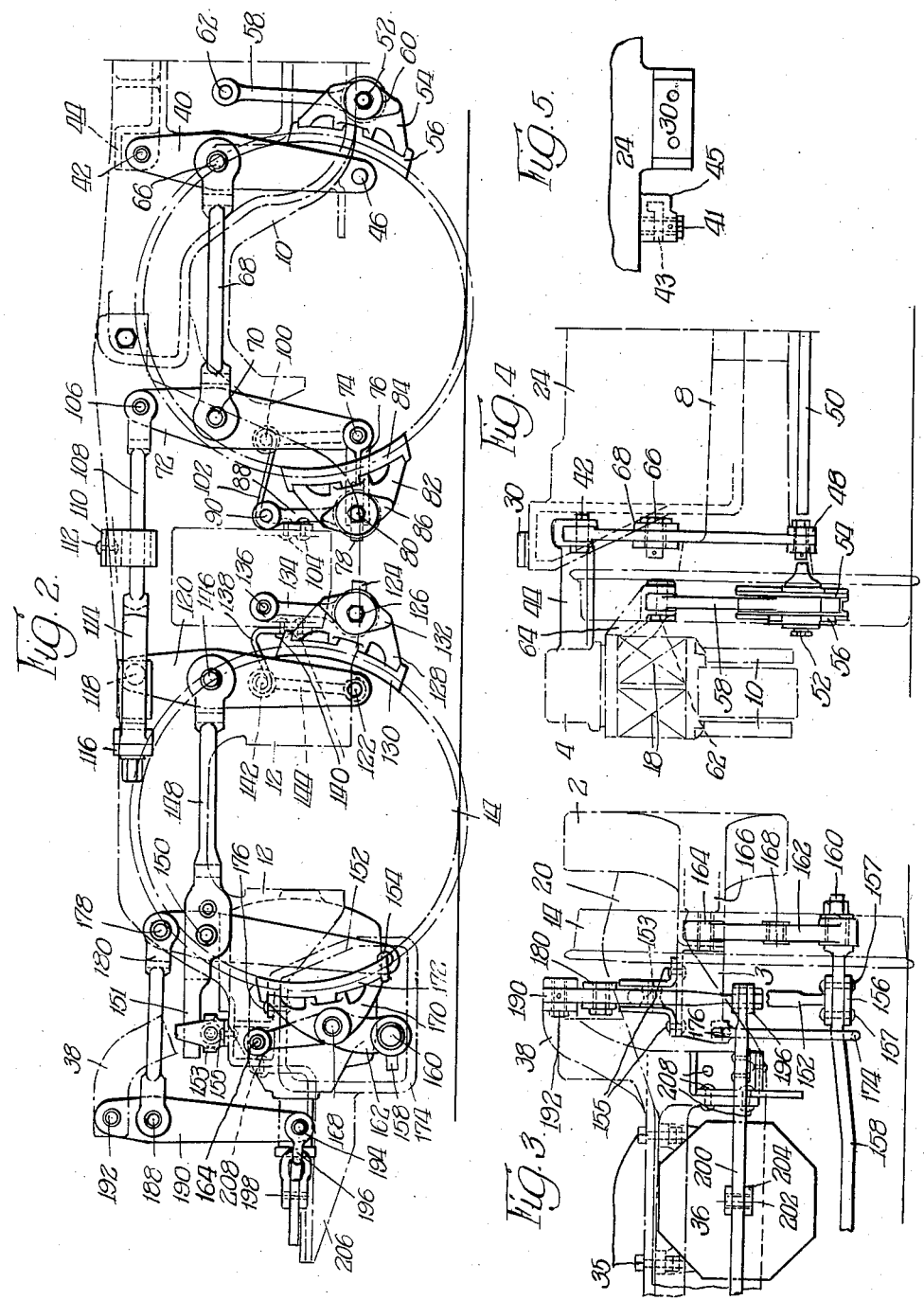
INVENTOR.
Edward J. Simanek,
BY
ATTORNEY.

Patented July 30, 1940

2,209,795

UNITED STATES PATENT OFFICE 2,209,795

CLASP BRAKE ARRANGEMENT

Edward J. Simanek, Chicago, Ill., assignor to American Steel Foundries, Chicago, Ill., a corporation of New Jersey Application August 25, 1938, Serial No. 226,609

28 Claims. (Cl. 188—46)

My invention relates to railway brake rigging and more particularly to the type of clasp brake rigging known as unit cylinder brakes wherein the power means is mounted on some portion of the car truck.

An object of my invention is to design a simple and practicable arrangement of the clasp brake of unit cylinder type for an eight wheel railway car truck. In such a truck structure it is scarcely practicable to connect the brake rigging throughout the length of the truck inasmuch as the wear of the parts makes necessary adjustments of too great length. To overcome this difficulty and for the sake of added simplicity, I have arranged my novel truck brake with a power means at each end of the truck operative to control the rigging for the length of one half the truck; in other words, to actuate the rigging associated with one pair of wheel and axle assemblies.

In a car truck of well known design I have so arranged the truck parts that the power means may be carried on the elongated end of the bolster member of the truck frame. Those skilled in the art will recognize that present novel car body arrangements at times make it necessary to position the power means in such a location as to make it substantially impractical to mount said power means on the end rail or on the side members of the truck frame. Under such circumstances one of the load carrying members, either the transom or the bolster may be availed of and, in this particular instance, I have mounted said power means on that member of the frame generally designated a span bolster.

The general object of my invention is to design a simple, compact and imminently practically operative arrangement of clasp brake rigging for an eight wheel car truck wherein the power means will be mounted in such a manner as to make available maximum space for the associated car body.

A further object of my invention is to so arrange the cylinder mounting means on the end of the span bolster as to permit said mounting means also to support the brake levers at the end of the car truck. The manner in which these objects and others are attained will be more apparent as the structure is described in more detail, as follows:

Figure 1 is a top plan view of one half of a truck and brake structure embodying my invention. In this top plan view, only one half of the truck structure is shown inasmuch as the truck and brake arrangement at the opposite ends thereof are substantially identical;

Figure 2 is a side elevation of the truck and brake arrangement shown in Figure 1;

Figure 3 is an end elevation of the truck and brake structures shown in Figures 1 and 2, the view being taken from the left as seen in those figures;

Figure 4 is a sectional view substantially in the transverse plane bisecting the truck at its mid-point, only one half of the truck being shown therein inasmuch as the structure is the same at both sides thereof, and as is clearly apparent from the top plan view of Figure 1;

Figure 5 is a fragmentary top plan view of an alternate arrangement for the dead end connection of the brake rigging at the middle of the truck, Figure 5 showing the brake arrangement dead ended off the center or span bolster whereas in Figure 1 the brakes are dead ended from a bracket off the side member.

Describing the structure in greater detail, the truck frame is of a well known general arrangement having the multiple-piece side members comprising the end portions 2, 2 with the inturned brackets 3, 3 and the center portions 4, 4, said portions being pivotally connected as at 6, 6, said pivotal connections occurring substantially over the intermediate wheel and axle assembly 8. Said assembly has the usual connection to the frame in the form of journal boxes (not shown) serving as supporting means also for the equalizers 10, 10 (Figure 4) which are likewise associated with the journal boxes of the other intermediate wheel and axle assembly at the opposite end of the truck. The end side frame member 2 has the pedestal jaws 12, 12 serving also as a means of connection to the journal box (not shown) associated with the end wheel and axle assembly 14. The end journal box structures serve also as supporting means for the spring assemblies positioned thereover as best seen at 16, 16 (Figure 1) and the center side members 4, 4 are likewise supported on the spring assemblies generally indicated at 18, 18 (Figures 1 and 4), said last mentioned spring assemblies being supported on the before mentioned equalizers 10 (Figure 4). The transom 20 is supported in the side members 2, 2 as best seen in Figure 1 and positioned with respect thereto by guide lugs 22, 22. Upon the spaced transoms 20, 20 at the opposite ends of the truck is carried the long span bolster or center bolster generally indicated at 24 having the side members 26, 26, center bearing 28 and adjacent side bearings 30, 30. The bolster side members 26, 26 are joined over the transom 20 by the integral strut member 32, and said side members 26, 26 are extended beyond said strut to merge in an end portion, 34, said end portion being in the general form of an inverted box within which may be supported as at 35, 35 the power means 36. At the opposite sides of said bolster end portion 34 are provided lateral arms 38, 38 projecting upwardly and outwardly of the end brackets 3, 3 and serving as brake lever fulcrums.

The brake rigging comprises at each side of the truck structure the dead brake lever 40 (Figure 2, right) pivotally connected as at 42 from the bracket 44 integrally formed with the side member 4. (In the alternate form shown in Figure 5, the dead lever 40 may be fulcrumed as at 41 in the jaw opening 43 of the bracket 45 integrally formed with the bolster 24.)

The lower end of the dead brake lever 40 is pivotally connected as at 46 to the fulcrum 48 secured on the brake beam 50 (Figure 4), and on the trunnion end of the beam 50 is pivotally connected as at 52 the brake head 54 with the associated brake shoe 56 arranged for cooperation with the periphery of the adjacent wheel. At the pivotal point 52 is also secured the lower end of the hanger 58, the connection of said head and said beam being maintained in proper adjustment with relation to said hanger by the balancing means 60 of well known form. The hanger 58 is pivotally hung from its upper end as at 62 from the bracket 64 integrally formed with the side member 4.

Intermediate its ends the dead brake lever 40 has a pivotal connection as at 66 to the pull rod 68, the opposite end of said pull rod having a pivotal connection as at 70 to a point intermediate the ends of the live truck lever 72, the lower end of said live truck lever having a pivotal connection as at 74 to the fulcrum 76 secured to the brake beam 78, said brake beam pivotally supporting on its trunnion end as at 80 the brake head 82 with the associated shoe 84, balancing means 86 of well known form being provided therefor. At the pivotal point 80 is also connected the lower end of the hanger 88, the upper end of said hanger being pivotally hung as at 90 from the bracket 92 integrally formed with the side member 2. At the mid-point of the beam 78 is provided the fulcrum 94 having a pivotal connection at its outer end as at 96 to the link 98, the upper end of said link having a pivotal connection as at 100 to the strap 102, the opposite end of which strap is secured as at 104 at its mid-point.

The upper end of the live truck lever 72 has a pivotal connection as at 106 to the pull rod 108, support for said pull rod being provided in the form of a strap 110 secured as at 112 on the top of the side member 2. The opposite end of the pull rod 108 is in the form of the jaw 114 having at its extremity the manual slack adjuster 116 and forming thereby an adjustable pivotal connection as at 118 with the upper end of the live truck lever 120. The lower end of the live truck lever 120 has a pivotal connection as at 122 with the fulcrum adjacent the end of the beam 124, said beam pivotally carrying on its trunnion end as at 126 the brake head 128 and the associated shoe 130, said brake head mounting being made adjustable as by the balancing means 132 of well known form. At the pivotal point 126 is also connected the lower end of the hanger 134 whose upper end is pivotally connected as at 136 from the before mentioned side member bracket 92. Balancing means for the beam 124 is provided at the middle thereof in the form of the strap 138 secured as at 140 to the transom 20, the outer end of said strap having a pivotal connection as at 142 to the link 144, the lower end of which is connected to the fulcrum at the mid-point of said beam 124.

Intermediate the ends of the live truck lever 120 is pivotally connected as at 146 the end of the pull rod 148, the opposite end of said pull rod having a pivotal and adjustable connection as at 150 to the live brake lever 152. The pull rod 148 is extended outwardly as at 151 to have engagement with and support from the anti-friction roller assembly 153 which is secured as at 155, 155 upon the in-turned end 3 of the side member 2. The live brake lever 152 has its lower end pivotally connected as at 154 to the fulcrum 156 secured as at 157 on the offset beam 158 adjacent an end thereof (Figure 3). At the trunnion end of the beam 158 as at 160 is pivotally connected the lower end of the hanger lever 162, the upper end thereof being pivotally hung as at 164 from the bracket 166 integrally formed on the in-turned end 3 of the side member 2. Intermediate the ends of the hanger lever 162 as at 168 is pivotally mounted the brake head 170 supporting the brake shoe 172. Safety means for the end brake beam 158 is in the form of the loop 174 which is supported as at 176 from the extremity of the in-turned bracket 3.

The upper end of the live truck lever 152 has a pivotal connection as at 178 with the pull rod 180, the opposite end of said pull rod 180 having a pivotal connection as at 188 to a point intermediate the ends of the dead cylinder lever 190, said cylinder lever being fulcrumed at its upper end as at 192 from the before mentioned arm 38 on the extended end of the bolster. The lower end of the cylinder lever 190 has a pivotal connection as at 194 to the clevis means 196, the opposite end of said clevis means having a pivotal connection as at 198 to an end of the equalizer 200. The mid-point of the equalizer 200 has a pivotal connection as at 202 to the piston rod 204 of the power means or brake cylinder 36 mounted as heretofore described. Sliding support for the equalizer lever 200 is in the form of the bracket 206 secured as at 208, 208 to the bolster end portion 34, previously described.

It will be understood that the above description as given of one side of the truck is equally applicable to the opposite side thereof and the parts at the opposite sides of Figure 1 are similarly designated. Also, the rigging at the opposite end of the truck is identical with that on the end shown and the operation thereof is the same.

In operation, assuming the parts to be in released position, actuation of the power means 36 moves the piston rod 204 to the left (Figure 1), thus actuating the equalizer 200 which in turn causes the dead cylinder levers 190, 190 to rotate in a clockwise direction (Figure 2) about the fulcrums 192 at their upper ends, thus actuating the braking means at the opposite sides of the truck as follows: Clockwise rotation of the live cylinder lever 190 about the fulcrum 192 at its upper end moves the pull rod 180 to the left, thus causing counter-clockwise rotation of the live truck lever 152 about the fulcrum 150 intermediate its ends and through the connection 154 at the lower end of said live truck lever moving the brake beam 158 to the right and bringing into engagement with the periphery of the adjacent wheel the brake shoe 172 supported intermediate the ends of the hanger lever 162. Continued actuation of the power means 36 causes the live truck lever 152 to rotate in a counter-clockwise direction about the fulcrum 154 at its lower end, thus moving to the left the pull rod 148 and causing clockwise rotation of the live truck lever 120 about the adjustable fulcrum at its upper end, thus moving to the left the brake beam 124 and bringing the brake shoes 130 into engagement with the opposite periphery of the last mentioned wheel. Continued actuation causes the live truck lever 120 to rotate in a counter-clockwise direction about the fulcrum 122 at its lower end, thus moving to the left the pull rod 108 and causing counter-clockwise rotation of the live truck lever 72 about the fulcrum 70 intermediate its ends until the brake shoe 84 on the brake beam 78 engages the periphery of the adjacent intermediate wheel. Continued actuation causes the live truck lever 72 to rotate in a counter-clockwise direction about the fulcrum 74 at its lower end moving to the left the pull rod 68 and applying clockwise rotation to the dead truck lever 40 about the fulcrum 42 at its upper end, thus bringing the brake shoe 56 carried on the beam 50 into engagement with the opposite periphery of the last mentioned wheel. Release of the power means causes the various parts to move in directions reverse to those just mentioned, thus releasing the brakes. It will be understood by those acquainted with the art that in the operation as above described, the various parts act substantially simultaneously and not successively. Such description is offered for the sake of clarity.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

I claim:

1. In an eight wheel railway car truck, a frame comprising side members and a load carrying member, said load carrying member having lateral means projecting outwardly of the ends of said truck and forming fulcrum arms, power means mounted on the ends of said load carrying member, supporting wheel and axle assemblies, and braking means associated with said wheels in the form of brake beams supported at opposite sides of each assembly, dead truck levers connected to the beams adjacent the transverse center line of said truck and having their upper ends fulcrumed from certain of said members, live truck levers connected to each of the other of said beams, pull rods interconnecting said truck levers at opposite sides of the truck, and an operative connection between the power means at each end of said truck and the adjacent live truck levers, said operative connection comprising cylinder levers supported from said fulcrum arms and operatively connected intermediate their ends to adjacent live truck levers at opposite sides of the truck, and an operative connection between said cylinder levers and the adjacent power means, said last mentioned operative connection being in the form of an equalizer having its mid-point connected to the adjacent power means and its opposite ends connected to the lower ends of said cylinder levers.

2. In an eight wheel railway car truck, a frame comprising side members and a load carrying member, supporting wheel and axle assemblies, power means on said load carrying member adjacent the end of said truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, said dead truck levers being fulcrumed at their upper ends from said sid members, pull rods interconnecting said live and dead truck levers at opposite sides of the truck, certain of said connections comprising slack adjusters, and an operative connection between the truck levers adjacent the end of the truck and said power means, said operative connection comprising dead cylinder levers fulcrumed from said load carrying member, a horizontal equalizer slidably supported from said load carrying member and connected intermediate its ends to said power means and at its opposite ends to said dead cylinder levers, and an operative connection between said dead cylinder levers and adjacent live truck levers at opposite sides of the truck.

3. In an eight wheel railway car truck, a frame comprising side members and a load carrying member, said load carrying member having lateral means projecting outwardly of the ends of said truck and forming fulcrum arms, power means mounted on the ends of said load carrying member, supporting wheel and axle assemblies, and braking means associated with said wheels in the form of brake beams supported at opposite sides of each assembly, dead truck levers connected to the beams adjacent the transverse center line of said truck and having their upper ends fulcrumed from certain of said members, live truck levers connected to each of the other of said beams, pull rods interconnecting said truck levers, and an operative connection between the power means at each end of said truck and the adjacent live truck levers at opposite sides of said truck, said operative connection comprising an equalizer slidably supported from said load carrying member outwardly of the end of said truck and connected intermediate its ends to said power means, dead cylinder levers connected to the ends of said equalizer, and pull rods connecting said dead cylinder levers and the adjacent live truck levers.

4. In an eight wheel railway car truck, a frame comprising side members and a load carrying member, said load carrying member having lateral means projecting outwardly of the ends of said truck and forming fulcrum arms, power means mounted on the ends of said load carrying member between said arms, supporting wheel and axle assemblies, and braking means associated with said wheels in the form of brake beams supported at opposite sides of each assembly, dead truck levers connected to the beams adjacent the transverse center line of said truck and having their upper ends fulcrumed from certain of said members, live truck levers connected to each of the other of said beams, pull rods interconnecting said truck levers at each side of the truck, and an operative connection between the power means at each end of said truck and the adjacent live truck levers at opposite sides thereof, said operative connection comprising cylinder levers pivoted at their upper ends from said fulcrum arms and connected intermediate their ends to the adjacent live truck levers, an equalizer connected between said cylinder levers, said equalizer having its mid-point connected to the adjacent power means.

5. In a railway car truck, a frame comprising side members and a load carrying member, supporting wheels and axles, power means mounted on said load carrying member adjacent the end of said truck, hangers supporting brake heads and brake beams intermediate the wheels, hanger levers supporting brake heads and brake beams outwardly of the wheels, live truck levers connected to the beams associated with an end wheel and axle assembly, live and dead truck levers connected to the beams associated with an intermediate assembly, pull rods interconnecting said live and dead truck levers, certain of said connections being adjustable, and an operative connection between said power means and the adjacent live truck levers, said operative connection comprising cylinder levers fulcrumed at their upper ends from said load carrying member outwardly of the end of said truck and connected intermediate their ends respectively to the adjacent live truck levers, said cylinder levers having their lower ends connected to opposite ends of an equalizer, a connection between said equalizer and said power means, and means carried on the ends of said load carrying member providing sliding support for said equalizer.

6. In an eight wheel railway car truck, a frame comprising side members and a load carrying member, supporting wheel and axle assemblies, power means on said load carrying member adjacent the end of said truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, said dead truck levers being fulcrumed at their upper ends from said side members, pull rods interconnecting said live and dead truck levers at opposite sides of the truck, and an operative connection between the truck levers adjacent the end of the truck and said power means, said operative connection comprising a horizontal equalizer slidably supported from said load carrying member and connected intermediate its ends to said power means, vertically arranged dead cylinder levers connected at their lower ends to opposite ends of said equalizer, and an operative connection between said dead cylinder levers and adjacent live truck levers at opposite sides of the truck.

7. In a railway car truck, a frame comprising side members and a load carrying member, supporting wheels and axles, power means mounted on said load carrying member adjacent the end of said truck, hangers supporting brake heads and brake beams intermediate the wheels, hanger levers supporting brake heads and brake beams outwardly of the wheels, live truck levers connected to the beams associated with an end wheel and axle assembly, live and dead truck levers connected to the beams associated with an intermediate assembly, pull rods interconnecting said live and dead truck levers, certain of said connections being adjustable, and an operative connection between said power means and the adjacent live truck levers, said operative connection comprising cylinder levers fulcrumed at their upper ends from said load carrying member outwardly of the end of said truck and connected intermediate their ends respectively to the adjacent live truck levers, said cylinder levers having their lower ends connected to opposite ends of an equalizer, and a connection between said equalizer and said power means.

8. In an eight wheel railway car truck, a frame comprising side members and a load carrying member, supporting wheel and axle assemblies, power means on said load carrying member adjacent the end of said truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, said dead truck levers having their upper ends fulcrumed from said side members respectively, pull rods interconnecting said live and dead truck levers at opposite sides of the truck, and an operative connection between the truck levers adjacent the end of the truck and said power means, said operative connection comprising dead cylinder levers, a horizontal equalizer slidably supported from said load carrying member and connected intermediate its ends to said power means and at its opposite ends to said dead cylinder levers, and an operative connection between said dead cylinder levers and adjacent live truck levers at opposite sides of the truck.

9. In an eight wheel railway car truck, a frame comprising side members and a load carrying member, said load carrying member having lateral means projecting outwardly of the ends of said truck and forming fulcrum arms, power means mounted on the ends of said load carrying member, supporting wheel and axle assemblies, and braking means associated with said wheels in the form of brake beams supported at opposite sides of each assembly, dead truck levers connected to the beams adjacent the transverse center line of said truck and having their upper ends fulcrumed from certain of said members, live truck levers connected to each of the other of said beams, pull rods interconnecting said truck levers, and an operative connection between the power means at each end of said truck and the adjacent live truck levers at opposite sides thereof, said operative connection comprising cylinder levers hung from said fulcrum arms and operatively connected intermediate their ends to adjacent live truck levers at opposite sides of the truck, and an operative connection between said cylinder levers and the adjacent power means.

10. In an eight wheel railway car truck, a frame comprising side members and a load carrying member, supporting wheel and axle assemblies, power means on said load carrying member adjacent the end of said truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, pull rods interconnecting said live and dead truck levers at opposite sides of the truck, and an operative connection between the truck levers adjacent the end of the truck and said power means, said operative connection comprising vertically arranged cylinder levers, a horizontal equalizer slidably supported from said load carrying member and connected intermediate its ends to said power means and at its opposite ends to said vertically arranged cylinder levers, and an operative connection between said cylinder levers and adjacent live truck levers at opposite sides of the truck.

11. In a brake rigging for an eight wheel railway car truck, a frame comprising a side member and a load carrying member, power means on said load carrying member, supporting wheel and axle assemblies, and clasp braking means cooperating with said wheels, said braking means comprising live and dead truck levers supported on opposite sides of an intermediate assembly, live truck levers supported on opposite sides of an end assembly, pull rods interconnecting adjacent truck levers, cylinder levers fulcrumed from said load carrying member outwardly of the end of said truck, pull rods connecting said cylinder levers at opposite sides of the truck with the adjacent live truck levers, and an operative connection between said cylinder levers and said power means, said operative connection comprising an equalizer having its mid-point connected to said power means and its opposite ends connected respectively to the lower ends of said cylinder levers, and means on said load carrying member providing slidable support for said equalizer.

12. In a brake rigging for an eight wheel railway car truck, a frame comprising a side member and a load carrying member, power means on said load carrying member, supporting wheel and axle assemblies, and clasp braking means cooperating with said wheels, said braking means comprising live and dead truck levers supported on opposite sides of an intermediate assembly, live truck levers supported on opposite sides of an end assembly, pull rods interconnecting adjacent truck levers, cylinder levers fulcrumed from said load carrying member outwardly of the end of said truck, pull rods connecting said cylinder levers at opposite sides of the truck with the adjacent live truck levers, and an operative connection between said cylinder levers and said power means, said operative connection comprising an equalizer having its mid-point connected to said power means and its opposite ends connected to the lower ends of said cylinder levers.

13. In an eight wheel railway car truck, a frame comprising side members and a load carrying member, supporting wheel and axle assemblies, power means on said load carrying member adjacent the end of said truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, said dead truck levers being fulcrumed at their upper ends from said load carrying member, pull rods interconnecting said live and dead truck levers at opposite sides of the truck, certain of said connections being made adjustable by slack adjusters, and an operative connection between the truck levers adjacent the end of the truck and said power means.

14. In an eight wheel railway car truck, a frame comprising side members and a load carrying member, said load carrying member having lateral means projecting outwardly of the ends of said truck and forming fulcrum arms, power means mounted on the ends of said load carrying member, supporting wheel and axle assemblies, and braking means associated with said wheels in the form of brake beams supported at opposite sides of each assembly, dead truck levers connected to the beams adjacent the transverse center line of said truck and having their upper ends fulcrumed from one of said members, live truck levers connected to each of the other of said beams, pull rods interconnecting said truck levers, and an operative connection between the power means at each end of said truck and the adjacent live truck levers at opposite sides of said truck.

15. In a railway car truck, a frame comprising side members and a load carrying member, end and intermediate supporting wheel and axle assemblies, power means on said load carrying member adjacent an end of said truck, and braking means associated with said assemblies and comprising dead truck levers fulcrumed from certain of said members adjacent the transverse center line of said truck and inwardly of an intermediate assembly, live truck levers supported at the opposite side of said intermediate assembly and at both sides of an end assembly, pull rods interconnecting said levers at each side of the truck, cylinder levers fulcrumed at their upper ends from said load carrying member and connected intermediate their ends to adjacent live truck levers, and an operative connection between said cylinder levers and said power means.

16. In a brake rigging for an eight wheel railway car truck, a frame comprising a side member and a load carrying member, power means on said load carrying member, supporting wheel and axle assemblies, and clasp braking means cooperating with said wheels, said braking means comprising live and dead truck levers supported on opposite sides of an intermediate assembly, live truck levers supported on opposite sides of an end assembly, pull rods interconnecting adjacent truck levers, cylinder levers fulcrumed from said load carrying member outwardly of the end of said truck, pull rods connecting said cylinder levers at opposite sides of the truck with the adjacent live truck levers, and an operative connection between said cylinder levers and said power means.

17. In an eight wheel railway car truck, a frame comprising side members and a load carrying member, supporting wheel and axle assemblies, power means on said load carrying member adjacent the end of said truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, said dead truck levers being fulcrumed at their upper ends from said side members, pull rods interconnecting said live and dead truck levers at opposite sides of the truck, and an operative connection between the truck levers adjacent the end of the truck and said power means.

18. In an eight wheel railway car truck, a frame comprising side members and a load carrying member, supporting wheel and axle assemblies, power means on said load carrying member adjacent the end of said truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, said dead truck levers having their upper ends fulcrumed from said side members respectively, pull rods interconnecting said live and dead truck levers at opposite sides of the truck, and an operative connection between the truck levers adjacent the end of the truck and said power means.

19. In a railway car truck, a frame comprising side members and a load carrying member, supporting wheels and axles, power means mounted on said load carrying member adjacent the end of said truck, hangers supporting brake heads and brake beams intermediate the wheels, hanger levers supporting brake heads and brake beams outwardly of the wheels, live truck levers connected to the beams associated with an end wheel and axle assembly, live and dead truck levers connected to the beams associated with an intermediate assembly, pull rods interconnecting said live and dead truck levers, certain of said connections being adjustable, and an operative connection between said power means and the adjacent live truck levers.

20. In an eight wheel railway car truck, a frame comprising side members and a load carrying member, supporting wheel and axle assemblies, power means on said load carrying member adjacent the end of said truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, pull rods interconnecting said live and dead truck levers at opposite sides of the truck, and an operative connection between the truck levers adjacent the end of the truck and said power means.

21. In a railway car truck, a center bolster, pressure fluid cylinders carried by opposite end portions of the bolster, a braking system for each half of the truck, a piston rod associated with each cylinder, and means operatively connecting each braking system to one of said piston rods.

22. In a railway car truck having a center bolster, a pressure fluid cylinder carried by an end portion of the bolster, a piston rod associated with the cylinder, and a braking system for a portion of the truck, having one end thereof operatively connected to the piston rod, and the other end thereof dead ended at a medial portion of the truck.

23. In a railway car truck having a center bolster, a pressure fluid cylinder carried by an end portion of the bolster, a piston rod associated with the cylinder, and a braking system for a portion of the truck, having one end thereof operatively connected to the piston rod, and the other end thereof dead ended at a medial portion of the truck, and means forming part of said system for taking up slack due to wear or the like.

24. In a brake rigging for a railway car truck having end and intermediate wheel and axle assemblies, a frame, transverse members, a center bolster supported on said transverse members, power means carried on said bolster adjacent opposite ends of said truck, brake rigging for opposite ends of said truck, each having braking means for an end and an intermediate assembly, and an operative connection between the power means and the brake rigging at each end of the truck.

25. In a brake rigging for a railway car truck having end and intermediate wheel and axle assemblies, a frame, transverse members, a center bolster supported on said transverse members, power means carried on said bolster adjacent opposite ends of said truck, brake rigging for opposite ends of said truck, each having braking means for an end and an intermediate assembly, and an operative connection between the power means and the brake rigging at each end of the truck, said operative connection comprising an equalizer connected at its midpoint to said power means and brake levers fulcrumed from said bolster and connected at opposite ends of said equalizer outwardly of the end of said frame.

26. In a railway car truck having a center bolster, pressure fluid cylinders arranged at opposite ends of the truck and supported by the end portions of the bolster, a piston rod associated with each cylinder, an equalizer lever having its medial portion pivotally connected to the piston rod of each cylinder, a braking system for each half of the truck, means operatively connecting one of said braking systems to the opposite ends of one of said levers, and means connecting the other braking system to the opposite ends of the other lever.

27. In a railway truck having supporting wheels, a side frame system and a center bolster, a braking system partially supported by the side frame system dead ended at a medial portion of the truck and provided at its opposite end with actuating levers connected to an end portion of the bolster, a pressure fluid cylinder carried by an end portion of the bolster, a piston rod associated with the cylinder, an equalizer lever having its medial portion pivotally connected to the piston rod, and articulated means connecting the end portions of the equalizer lever to the first mentioned levers.

28. In an eight wheel railway car truck, a frame comprising side members and a load carrying member, supporting wheel and axle assemblies, power means on said load carrying member adjacent the end of the truck, hangers supporting brake beams intermediate the wheels, hanger levers supporting a brake beam outwardly of the wheels, live truck levers connected to the beams associated with an end assembly, live and dead truck levers connected to the beams associated with an intermediate assembly, said dead truck levers being fulcrumed at their upper ends from said side frame members, pull rods interconnecting said live and dead truck levers at opposite sides of the truck, and an operative connection between the truck levers adjacent the end of the truck and said power means.

EDWARD J. SIMANEK.

CERTIFICATE OF CORRECTION.

Patent No. 2,209,795.   July 30, 1940.

EDWARD J. SIMANEK.

It is hereby certified that error appears in the printed specification of the above numbered patent requiring correction as follows: Page 3, second column, line 12, claim 2, for "sid members" read --load carrying member--; page 4, first column, line 42, and page 5, second column, line 54, claims 6 and 17 respectively, for the words "side members" read --load carrying member--; and that the said Letters Patent should be read with this correction therein that the same may conform to the record of the case in the Patent Office.

Signed and sealed this 21st day of January, A. D. 1941.

(Seal)

Henry Van Arsdale,
Acting Commissioner of Patents.